(12) United States Patent
Derelov et al.

(10) Patent No.: US 11,246,415 B2
(45) Date of Patent: Feb. 15, 2022

(54) PANELS COMPRISING A MECHANICAL LOCKING DEVICE AND AN ASSEMBLED PRODUCT COMPRISING THE PANELS

(71) Applicant: VALINGE INNOVATION AB, Viken (SE)

(72) Inventors: Peter Derelov, Helsingborg (SE); Mats Nilsson, Viken (SE)

(73) Assignee: VALINGE INNOVATION AB, Viken (SE)

(*) Notice: Subject to any disclaimer, the term of this patent is extended or adjusted under 35 U.S.C. 154(b) by 0 days.

(21) Appl. No.: 16/567,436

(22) Filed: Sep. 11, 2019

(65) Prior Publication Data
US 2020/0214447 A1 Jul. 9, 2020

Related U.S. Application Data

(63) Continuation of application No. 15/271,622, filed on Sep. 21, 2016, now Pat. No. 10,448,739.

(30) Foreign Application Priority Data

Sep. 22, 2015 (SE) .................................... 1551211-4

(51) Int. Cl.
*A47B 96/20* (2006.01)
*A47B 47/04* (2006.01)
(Continued)

(52) U.S. Cl.
CPC .......... *A47B 96/201* (2013.01); *A47B 47/042* (2013.01); *F16B 12/125* (2013.01);
(Continued)

(58) Field of Classification Search
CPC . A47B 96/201; A47B 47/042; A47B 2230/16; F16B 12/24; F16B 12/125;
(Continued)

(56) References Cited

U.S. PATENT DOCUMENTS 291,032 A 1/1884 Cleland
634,581 A 10/1899 Miller
(Continued)

FOREIGN PATENT DOCUMENTS

AT 400 611 B 2/1996
CH 365 507 A 11/1962
(Continued)

OTHER PUBLICATIONS

U.S. Appl. No. 14/573,572, Christian Boo, filed Dec. 17, 2014, (Cited herein as US Patent Application Publication No. 2015/0198191 A1 of Jul. 16, 2015).
(Continued)

*Primary Examiner* — Daniel J Troy
*Assistant Examiner* — Timothy M Ayres
(74) *Attorney, Agent, or Firm* — Buchanan Ingersoll & Rooney P.C.

(57) ABSTRACT

A set of panels including a panel with a first main plane and an adjacent panel with a second main plane, wherein the panel and the adjacent panel are provided with an angleable locking device for locking a first edge of the panel to a second edge of the adjacent panel. The first main plane is essentially perpendicular to the second main plane. The angleable locking device includes an edge groove at the first edge and a tongue groove at the second edge. The edge groove includes a flexible tongue arranged in an insertion groove at a first side of the edge groove. The angleable locking device is configured to be unlocked by an angling motion of the panel relative the adjacent panel, such that an angle between the first and the second main plane increases.

5 Claims, 11 Drawing Sheets

(51) Int. Cl.
  *F16B 12/24* (2006.01)
  *F16B 12/12* (2006.01)
  *F16B 12/46* (2006.01)
  *F16B 12/44* (2006.01)
  *E04B 1/61* (2006.01)

(52) U.S. Cl.
  CPC .............. *F16B 12/24* (2013.01); *F16B 12/44* (2013.01); *F16B 12/46* (2013.01); *A47B 2230/06* (2013.01); *A47B 2230/16* (2013.01); *E04B 1/6141* (2013.01); *E04B 2001/6195* (2013.01)

(58) Field of Classification Search
  CPC ........ F16B 12/44; F16B 12/46; E04B 1/6141; E04B 2001/6195
  USPC ....................................................... 312/263
  See application file for complete search history.

(56) References Cited

U.S. PATENT DOCUMENTS

| | | |
|---|---|---|
| 701,000 A | 5/1902 | Ahrens |
| 861,911 A | 7/1907 | Stewart |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Von Canon |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schörghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,293 A | 7/1978 | Pittasch |
| 4,099,887 A | 7/1978 | MacKenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang |
| 4,593,734 A | 6/1986 | Wallace |
| 4,595,105 A | 6/1986 | Gold |
| 4,597,122 A | 7/1986 | Handler |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch, Sr. et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,536,108 A | 7/1996 | Kvalheim |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott |
| 5,882,098 A * | 3/1999 | Brown .................... A47B 3/08 108/179 |
| 5,893,617 A | 4/1999 | Lee |
| 5,941,026 A | 8/1999 | Eisenreich |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Röck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson |
| 6,491,172 B2 | 12/2002 | Chance |
| 6,505,452 B1 | 1/2003 | Hannig |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger |
| 7,998,549 B2 | 8/2011 | Susnjara |
| 8,033,074 B2 | 10/2011 | Pervan |
| 8,038,363 B2 | 10/2011 | Hannig |
| 8,042,311 B2 | 10/2011 | Pervan |
| 8,146,754 B2 | 4/2012 | Apgood |
| 8,220,217 B2 | 7/2012 | Muehlebach |
| 8,234,830 B2 | 8/2012 | Pervan |
| 8,365,499 B2 | 2/2013 | Nilsson et al. |
| 8,387,327 B2 | 3/2013 | Pervan |

(56) References Cited

U.S. PATENT DOCUMENTS

| | | |
|---|---|---|
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | McDonald |
| 8,615,952 B2 | 12/2013 | Engström |
| 8,713,886 B2 | 5/2014 | Pervan |
| 8,745,952 B2 | 6/2014 | Perra |
| 8,764,137 B2 | 7/2014 | Fehre |
| 8,776,473 B2 | 7/2014 | Pervan |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Håkansson et al. |
| 9,175,703 B2 | 11/2015 | Maertens |
| 9,216,541 B2 | 12/2015 | Boo |
| 9,290,948 B2 | 3/2016 | Cappelle et al. |
| 9,375,085 B2 | 6/2016 | Derelöv |
| 9,538,842 B2 | 1/2017 | Håkansson et al. |
| 9,655,442 B2 | 5/2017 | Boo et al. |
| 9,700,157 B2 | 7/2017 | Keyvanloo |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 * | 10/2019 | Derelöv ............... A47B 47/042 |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | HåKansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0104483 A1 * | 5/2005 | Saravis ............... F16B 12/26 312/111 |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2007/0193178 A1 | 8/2007 | Groeke et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 | 3/2015 | Brännström et al. |
| 2015/0078819 A1 * | 3/2015 | Derelöv ............... F16B 12/46 403/375 |
| 2015/0196118 A1 * | 7/2015 | Derelöv ............... A47B 47/042 403/20 |
| 2015/0198191 A1 | 7/2015 | Boo |
| 2015/0230600 A1 | 8/2015 | Schulte |
| 2015/0330088 A1 | 11/2015 | Derelöv |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |

(56) References Cited

U.S. PATENT DOCUMENTS

| | | |
|---|---|---|
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |

FOREIGN PATENT DOCUMENTS

| | | |
|---|---|---|
| CH | 685 276 A5 | 5/1995 |
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 20 2014 100 090 * | 11/2014 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 799155 A | 8/1958 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 10/2003 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/070605 * | 6/2010 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A8 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/138874 A1 | 8/2017 |
| WO | WO 2018/004435 A1 | 1/2018 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 15/308,872, Darko Pervan, filed Nov. 4, 2016, (Cited herein as US Patent Application No. 2017/0089379 A1 of Mar. 30, 2017).

U.S. Appl. No. 15/432,190, Magnus Fridlund, filed Feb. 14, 2017, (Cited herein as US Patent Application Publication No. 2017/0234346 A1 of Aug. 17, 2017).

U.S. Appl. No. 15/642,757, Peter Derelöv, filed Jul. 6, 2017, (Cited herein as US Patent Application Publication No. 2017/0298973 A1 of Oct. 19, 2017).

U.S. Appl. No. 15/646,714, Peter Derelöv, Hans Brännström and Agne Pålsson, filed Jul. 11, 2017, (Cited herein as US Patent Application Publication No. 2018/0087552 A1 of Mar. 29, 2018).

(56) References Cited

OTHER PUBLICATIONS

U.S. Appl. No. 15/562,254, Peter Derelöv, filed Sep. 27, 2017, (Cited herein as US Patent Application Publication No. 2018/0080488 A1 of Mar. 22, 2018).
U.S. Appl. No. 15/567,507, Christian Boo, Peter Derelöv and Agne Pålsson, filed Oct. 18, 2017, (Cited herein as US Patent Application Publication No. 2018/0112695 A1 of Apr. 26, 2018).
U.S. Appl. No. 15/794,491, Peter Derelöv, filed Oct. 26, 2017, (Cited herein as US Patent Application Publication No. 2018/0119717 A1 of May 3, 2018).
U.S. Appl. No. 15/923,701, Peter Derelöv, filed Mar. 16, 2018, (Cited herein as US Patent Application Publication No. 2018/0202160 A1 of Jul. 19, 2018).
U.S. Appl. No. 15/956,949, Peter Derelöv, filed Apr. 19, 2018, (Cited herein as US Patent Application Publication No. 2019/0323535 A1 of Oct. 24, 2019).
U.S. Appl. No. 15/978,630, Jonas Fransson, Niclas Håkansson and Agne Pålsson, filed May 14, 2018, (Cited herein as US Patent Application No. 2018/0328396 A1 of Nov. 15, 2018).
U.S. Appl. No. 16/228,975, Niclas Håkansson and Darko Pervan, filed Dec. 21, 2018, (Cited herein as US Patent Application Publication No. 2019/0113061 A1 of Apr. 18, 2019).
U.S. Appl. No. 16/220,574, Peter Derelöv, filed Dec. 14, 2018, (Cited herein as US Patent Application Publication No. 2019/0195256 A1 of Jun. 27, 2019).
U.S. Appl. No. 16/220,585, Peter Derelöv, filed Dec. 14, 2018, (Cited herein as US Patent Application Publication No. 2019/0191870 A1 of Jun. 27, 2019).
U.S. Appl. No. 16/361,609, Peter Derelöv, Johan Svensson and Lars Gunnarsson, filed Mar. 22, 2019, (cited herein as US Patent Application Publication No. 2019/0289999 A1 of Sep. 26, 2019).
U.S. Appl. No. 16/386,732, Christian Boo, filed Apr. 17, 2019, (Cited herein as US Patent Application Publication No. 2019/0323532 A1 of Oct. 24, 2019).
U.S. Appl. No. 16/386,810, Christian Boo, filed Apr. 17, 2019, (Cited herein as US Patent Application Publication No. 2019/0323533 A1 of Oct. 24, 2019).
U.S. Appl. No. 16/386,824, Christian Boo, filed Apr. 17, 2019, (Cited herein as US Patent Application Publication No. 2019/0320793 A1 of Oct. 24, 2019).
U.S. Appl. No. 16/386,874, Peter Derelöv, filed Apr. 17, 2019, (Cited herein as US Patent Application Publication No. 2019/0323534 A1 of Oct. 24, 2019).
U.S. Appl. No. 16/564,438, Hans Brännström, Agne Pålsson and Peter Derelöv, filed Sep. 9, 2019, (Cited herein as US Patent Application Publication No. 2020/0003242 A1 of Jan. 2, 2020).
U.S. Appl. No. 16/553,325, Peter Derelöv and Johan Svensson, filed Aug. 28, 2019, (Cited herein as US Patent Application Publication No. 2020/0069048 A1 of Mar. 5, 2020).
U.S. Appl. No. 16/553,350, Peter Derelöv and Johan Svensson, filed Aug. 28, 2019, (Cited herein as US Patent Application Publication No. 2020/0069049 A1 of Mar. 5, 2020).
U.S. Appl. No. 16/663,603, Magnus Fridlund, filed Oct. 25, 2019, (Cited herein as US Patent Application Publication No. 2020/0055126 A1 of Feb. 20, 2020).
U.S. Appl. No. 16/703,077, Magnus Fridlund, filed Dec. 4, 2019, (Cited herein as US Patent Application Publication No. 2020/0102978 A1 of Apr. 2, 2020).
U.S. Appl. No. 16/697,335, Christian Boo and Peter Derelöv, filed Nov. 27, 2019.
U.S. Appl. No. 16/722,096, Peter Derelöv and Christian Boo, filed Dec. 20, 2019.
U.S. Appl. No. 16/861,639, Peter Derelöv, filed Apr. 29, 2020.
International Search Report/Written Opinion dated Nov. 28, 2016 in PCT/SE2016/050887, ISA/SE, Stockholm, SE, 16 pages.
Extended European Search Report issued in EP Application No. 16849109.0, Jan. 16, 2019, European Patent Office, Munich, DE, 9 pages.
Boo, Christian, et al., U.S. Appl. No. 16/697,335 entitled "Panels Comprising a Mechanical Locking Device and an Assembled Product Comprising the Panels," filed in the U.S. Patent and Trademark Office on Nov. 27, 2019.
Derelöv, Peter, et al., U.S. Appl. No. 16/722,096 entitled "Panels Comprising a Mechanical Locking Device and an Assembled Product Comprising the Panels," filed in the U.S. Patent and Trademark Office on Dec. 20, 2019.
Derelöv, Peter, U.S. Appl. No. 16/861,639 entitled "Panels Comprising a Mechanical Locking Device and an Assembled Product Comprising the Panels," filed in the U.S. Patent and Trademark Office on Apr. 29, 2020.
Pervan, Darko, U.S. Appl. No. 16/946,047 entitled "Mechanical Locking System for Building Panels," filed in the U.S. Patent and Trademark Office on Jun. 4, 2020.
Brännström, Hans, et al., U.S. Appl. No. 16/915,258 entitled "Assembled Product and Method of Assembling the Assembled Product," filed in the U.S. Patent and Trademark Office on Jun. 29, 2020.
Håkansson, Niclas, et al., U.S. Appl. No. 16/951,394 entitled "Mechanical Locking System for Building Panels," filed in the U.S. Patent and Trademark Office on Nov. 18, 2020.
Derelöv, Peter, et al., U.S. Appl. No. 16/953,608 entitled "An Assembled Product and a Method of Assembling the Product," filed in the U.S. Patent and Trademark Office on Nov. 20, 2020.
Bruno, Jimmie, et al. U.S. Appl. No. 17/119,392 entitled "Mechanical Locking System for Panels," filed in the U.S. Patent and Trademark Office on Dec. 11, 2020.
Derelöv, Peter, U.S. Appl. No. 17/126,518 entitled "Set of Panels with a Mechanical Locking Device," filed in the U.S. Patent and Trademark Office on Dec. 18, 2020.
Meijer, Thomas, U.S. Appl. No. 17/398,416 entitled "Panels with Edge Reinforcement," filed in the U.S. Patent and Trademark Office Aug. 10, 2021.

\* cited by examiner

PANELS COMPRISING A MECHANICAL LOCKING DEVICE AND AN ASSEMBLED PRODUCT COMPRISING THE PANELS

CROSS REFERENCE TO RELATED APPLICATIONS

The present application is a continuation of U.S. application Ser. No. 15/271,622, filed on Sep. 21, 2016, which claims the benefit of Swedish Application No. 1551211-4, filed on Sep. 22, 2015. The entire contents of each of U.S. application Ser. No. 15/271,622 and Swedish Application No. 1551211-4 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise a flexible tongue.

BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

SUMMARY

One object of certain embodiments of the present invention to provide an improvement over the above described technique and the known art. A specific objective is to improve disassembling of a mechanical locking of an assembled product, such as a furniture, a furniture component, a drawer, a cupboard, a bookshelf, a wardrobe, a kitchen fixture, or a box for storing or transporting.

A further object of embodiments of the invention is to provide an improved method to disassemble a furniture product comprising a frame and a back piece.

At least some of these and other objects and advantages that will be apparent from the description have been achieved by a first aspect of the invention that includes a set of panels, preferably for a furniture product, comprising a panel with a first main plane and an adjacent panel with a second main plane, wherein the panel and the adjacent panel comprising an angleable locking device for locking a first edge of the panel to a second edge of the adjacent panel, wherein the first main plane is essentially perpendicular to the second main plane. The angleable locking device comprises an edge groove at the first edge and a tongue groove at the second edge, the edge groove comprises a flexible tongue arranged in an insertion groove at a first side of the edge groove, said flexible tongue is configured to cooperate with the tongue groove for locking together the first and the second edges in a first direction which is perpendicular to the first main plane. The angleable locking device further comprises contact surfaces between the edge groove and the second edge at the first side and at a second side, respectively, of the edge groove for locking together the first and the second edges in a second direction which is parallel to the first main plane.

The angleable locking device is configured to be unlocked by an angling motion of the panel relative the adjacent panel, such that an angle between the first and the second main plane increases. This may facilitate disassembling of the panel and the adjacent panel since the angleable locking device may be unlocked without a tool.

The flexible tongue may facilitate assembling by a linear displacement of the panel relative the adjacent panel in a direction essentially perpendicular to the first main plane.

The panel is preferably frame panel and the adjacent panel is preferably a back piece panel.

The angleable locking device is preferably configured such that the flexible tongue moves out of the tongue groove by the angling motion.

The angleable locking device may comprise a first space between the first edge and the second edge at a second side of an opening of the edge groove in a locked position of the panel and the adjacent panel. The first space is preferably at an outer edge surface at an outer corner of the panel and the adjacent panel in a locked position.

The angleable locking device may comprise cooperating surfaces at a first side of the opening of the edge groove in a locked position of the panel and the adjacent panel, preferably at an inner corner of the panel and the adjacent panel.

The angleable locking device may comprise a recess, such as a bevel, at the first edge, to obtain said first space.

The angleable locking device may comprise a recess at the second edge to obtain said first space.

The angleable locking device may comprise a recess, such as a bevel, at a first and/or a second outer edge for enabling said angling motion.

The angleable locking device may comprise a second space between an outer edge of the second edge and the edge groove at the first side of the edge groove for enabling said angling motion. The second space preferably extends a distance which is about the same or greater than a length of the contact surface between the edge groove and the second edge at the second side of the edge groove, in a depth direction of the edge groove. The distance may be shorter than two or three times the length of the contact surface between the edge groove and the second edge.

The edge groove may extend along essentially the entire length of the second edge.

The flexible tongue may be displaceable in the insertion groove.

The angleable locking device may comprise a third space between an outermost surface of the second edge and the edge groove.

The angleable locking device may comprise cooperating surfaces at the second side of an opening of the edge groove, preferably at an outer edge surface at an outer corner of the panel and the adjacent panel in a locked position. This may provide a tight joint or a joint without visible gaps.

The angleable locking device may comprise a bottom part of the panel at a bottom of the edge groove and a side part, wherein the bottom part is bendable such that the side part is displaceable and/or angleable for enabling said angling motion.

The angleable locking device may comprise a bevel or rounding at an opening of the tongue groove. The flexible tongue may easier slide out from the tongue groove due to said rounding or bevel.

The second edge and the edge groove may comprise cooperating surfaces at the first side of the edge groove, preferably between the insertion groove and a bottom surface of the edge groove, for positioning of the edge relative the edge groove in the depth direction. The cooperating surfaces may be between a first surface of a recess at the second edge and a second surface of a recess at the edge groove.

The insertion groove may extend along essentially the entire length of the edge groove.

The flexible tongue is preferably displaceable in the insertion groove.

Some or all features that facilitate unlocking by an angling motion may be combined in one embodiment to improve the unlocking.

The flexible tongue may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

A core material of the panel and/or the adjacent panel may comprise a wood fibre based board, such as a HDF, MDF, plywood, solid wood or particleboard, or a reinforced plastic board or a wood fibre composite board.

The core may be provided with a decorative layer.

A second aspect of the invention is an assembled furniture product comprising a frame and a back piece, wherein the frame comprises panels, wherein a first and a second corner of the frame each comprises a corner locking device for locking two adjacent panels to each other, said corner locking device comprising a flexible tongue, wherein the corner locking device is un-lockable by displacing and/or compressing the flexible tongue by a tool. The back piece is connected to the frame by the angleable locking device according to the first aspect. The back piece may comprise four edges. A third and a fourth corner of the frame may each comprises a corner locking device for locking two adjacent panels to each other, said corner locking device comprising a flexible tongue, wherein the corner locking device is un-lockable by displacing and/or compressing the flexible tongue by a tool. The back piece is, in a preferred embodiment of the assembled furniture product, connected at four edges to the frame. Each edge is preferably connected by the angleable locking device according to the first aspect.

A third aspect of the invention is a method for disassembling a furniture product comprising a frame and a back piece, wherein the method comprises:
- un-locking a first and a second corner locking device, at a first edge and at a second edge of a top panel, respectively, by displacing and/or compressing a flexible tongue of the first and of the second corner locking device, respectively,
- angling up the top panel by an angling motion, and
- unlocking by said angling motion a back piece connected to the top panel by an angleable locking device, and removing the top panel.

The method may comprise:
- rotating the furniture, preferably such that a bottom panel of the furniture product is at the top,
- un-locking a third and a fourth corner locking device, at a third edge and at a fourth edge of a bottom panel, respectively, by displacing and/or compressing a flexible tongue of the third and of the fourth corner locking device, respectively,
- angling up the bottom panel by an angling motion, and
- unlocking by said angling motion the back piece connected to the bottom panel by an angleable locking device, and removing the bottom panel.

The method may comprise unlocking a first side panel and a second side panel of the frame. The first side panel may be unlocked by an angling motion or a sliding motion of the first panel relative the back piece. The second side panel may be unlocked by an angling motion or a sliding motion of the second panel relative the back piece. The first side panel may alternative be unlocked by displacing and/or compressing a flexible tongue of a locking device at a joint between the first side panel and the back piece. The second side panel may alternative be unlocked by displacing and/or compressing a flexible tongue of a locking device at a joint between the second side panel and the back piece.

BRIEF DESCRIPTION OF THE DRAWINGS

Embodiments of the present invention will by way of example be described in more detail with reference to the appended schematic drawings, in which.

DETAILED DESCRIPTION

Figure 1A:
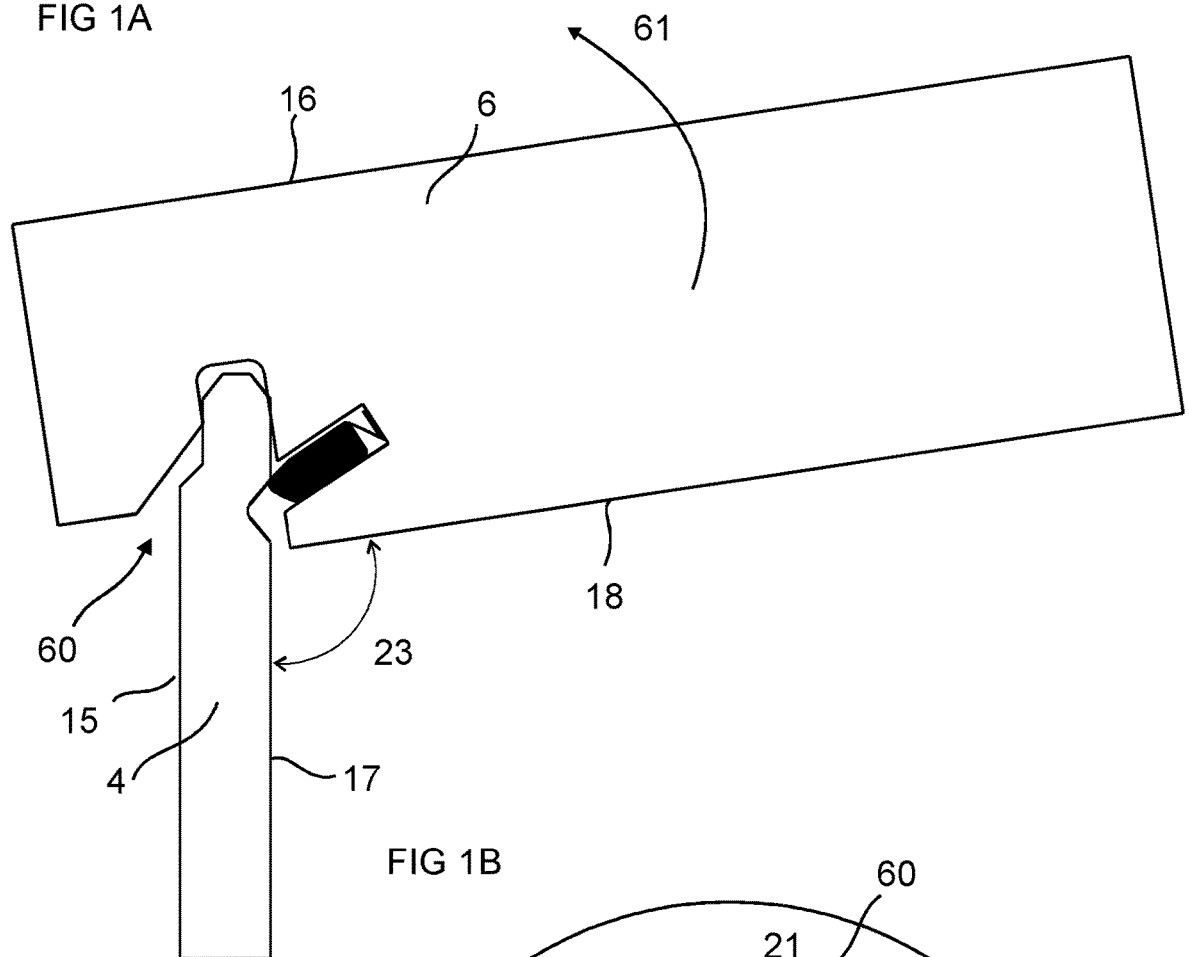
FIGS. 1A-1B show panels provided with an angleable locking device according to an embodiment of the invention.

FIG. 1A shows a disassembling of a panel 6 from an adjacent panel 4. The panel 6 and the adjacent panel 4 are provided with an embodiment of an angleable locking device 60. The panel 6 may be a top panel of a frame, such as a frame for a furniture product, and the adjacent 4 panel may be a back piece configured to be connected to the top panel.

Figure 1B:
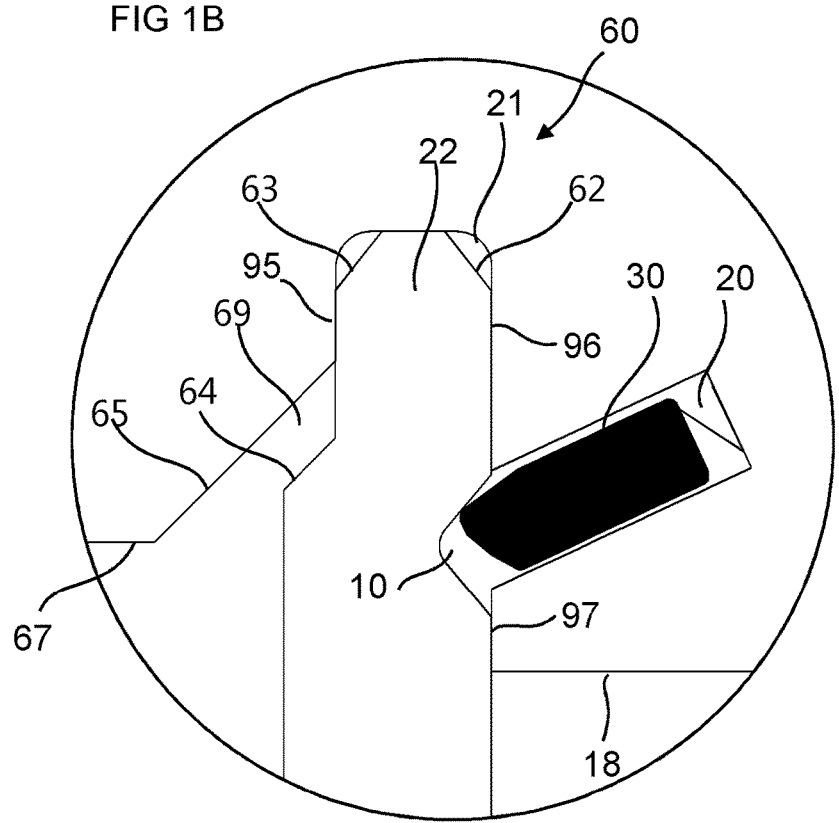

FIG. 1B shows an enlarged view of the angleable locking device 60 in a locked position of the panel and the adjacent panel. The panel 6 has a first main plane and an adjacent panel 4 has a second main plane. The first main plane is essentially perpendicular to the second main plane in the locked position. The angleable locking device 60 is configured for locking a first edge of the panel 6 to a second edge 22 of the adjacent panel 4. The angleable locking device comprises an edge groove 21 at the first edge and a tongue groove 10 at the second edge. The edge groove 21 comprises a flexible tongue 30 arranged in an insertion groove 20 at a first side of the edge groove 21, said flexible tongue is configured to cooperate with the tongue groove 10 for locking together the first and the second edges in a first direction which is perpendicular to the first main plane.

The angleable locking device 60 further comprises contact surfaces 96, 95, between the edge groove 21 and the second edge 22 at the first side and at a second side, respectively, of the edge groove 21 for locking together the first and the second edges in a second direction which is parallel to the first main plane. The angleable locking device 60 is configured to be unlocked by an angling motion 61 of the panel 6 relative the adjacent panel 4, such that an angle 23 between the first and the second main plane increases.

The panel 6 and the adjacent panel 4 each preferably comprises four edges, an outer surface 16,15 and an inner surface 18,17. The first main plane is parallel to the outer surface 16 of the panel and the second main plane is parallel to the outer surface 15 of the adjacent panel.

The outer and/or the inner surfaces may comprise a decorative layer (not shown).

The angleable locking device 60 is preferably configured such that the flexible tongue 30 moves out of the tongue groove 10 by the angling motion 61. Part(s) of the panel, the adjacent panel, and/or the angleable locking device may be compressed during the angling motion. The angleable locking device may comprise a first space 69 between the first edge and the second edge 22 at a second side of an opening of the edge groove 21 in a locked position of the panel and the adjacent panel. The angleable locking device may comprise a recess 65, such as a bevel, at the first edge and/or a recess 64 at the second edge, to obtain said first space. A first and/or a second outer edge of the adjacent panel 4 may be provided with a recess 63,62, such as a bevel, for enabling said angling motion 61. A space is preferably obtained by each said recess.

The angleable locking device may comprise cooperating surfaces 97 at a first side of the opening of the edge groove 21 in a locked position of the panel 6 and the adjacent panel 4, preferably at an inner corner of the panel and the adjacent panel.

The edge groove 21 preferably extends along essentially the entire length of the second edge.

The flexible tongue 30 is preferably displaceable in the insertion groove 20. The tongue and the insertion groove may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

Figure 2A:
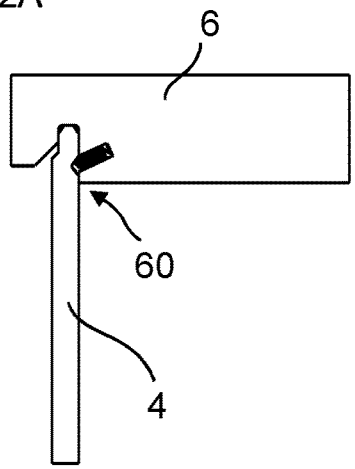
FIGS. 2A-2C show an embodiment of a method to disassemble an embodiment of the present invention.
Figure 2D:
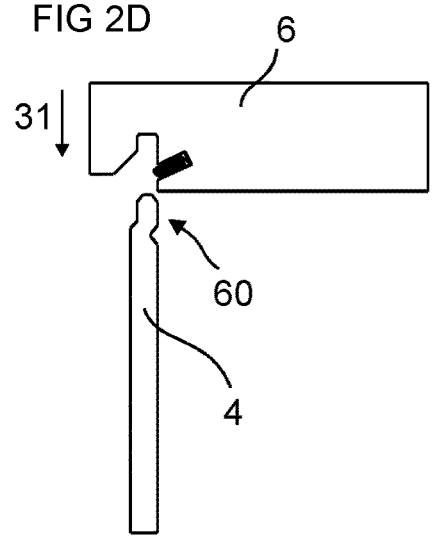
FIGS. 2D-2F show an embodiment of a method to assemble the embodiment shown in FIGS. 2A-2C.
Figure 2B:
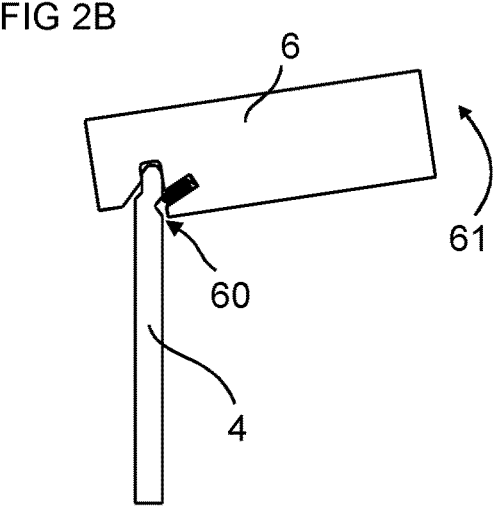
Figure 2E:
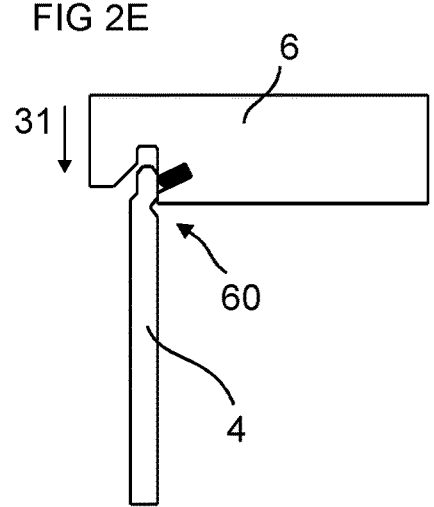
Figure 2C:
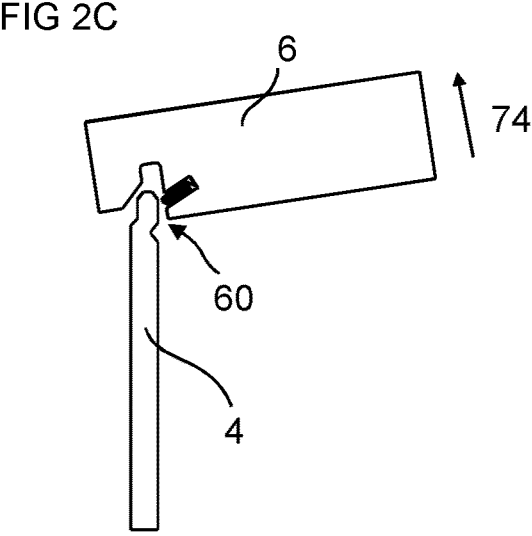
Figure 2F:
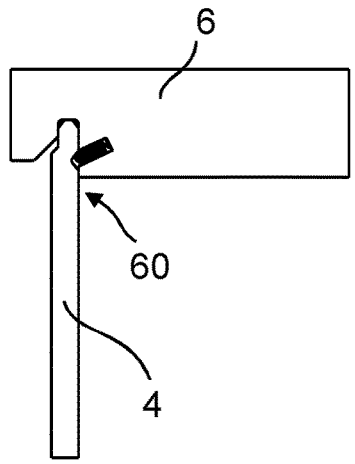

In the present disclosure, FIGS. 2A-2C show an embodiment of a method to disassemble and FIG. 2D-2F a method to assemble an embodiment of the panel 6 and the adjacent panel 4 described above. FIG. 2A shows the panel 6 and the adjacent panel 4 in a locked position. FIG. 2B shows that the panel 6 is angled upwards by an angling motion 61, wherein an angle between the panel and the adjacent panel is increased and the flexible tongue moves out of the tongue groove 10. FIG. 2C shows a displacement 74 of the panel in a direction which may be diagonally upward. The angle of the displacement depends on the configuration of the angleable locking device. The displacement and the angling motion may be performed simultaneous. FIG. 2D shows that the panel 6 is displaced 31 relative the adjacent panel in a direction which is essentially parallel to the second main plane. FIG. 2E shows that flexible tongue is displaced and compressed into the insertion groove. The flexible tongue springs at least partly back when the panel 6 and the adjacent panel 4 has reached a final locked position, as shown in FIG. 2F. The panel 6 and adjacent panel 4 could also be assembled by reversing the movements shown in FIGS. 2A-2C.

Figure 3:
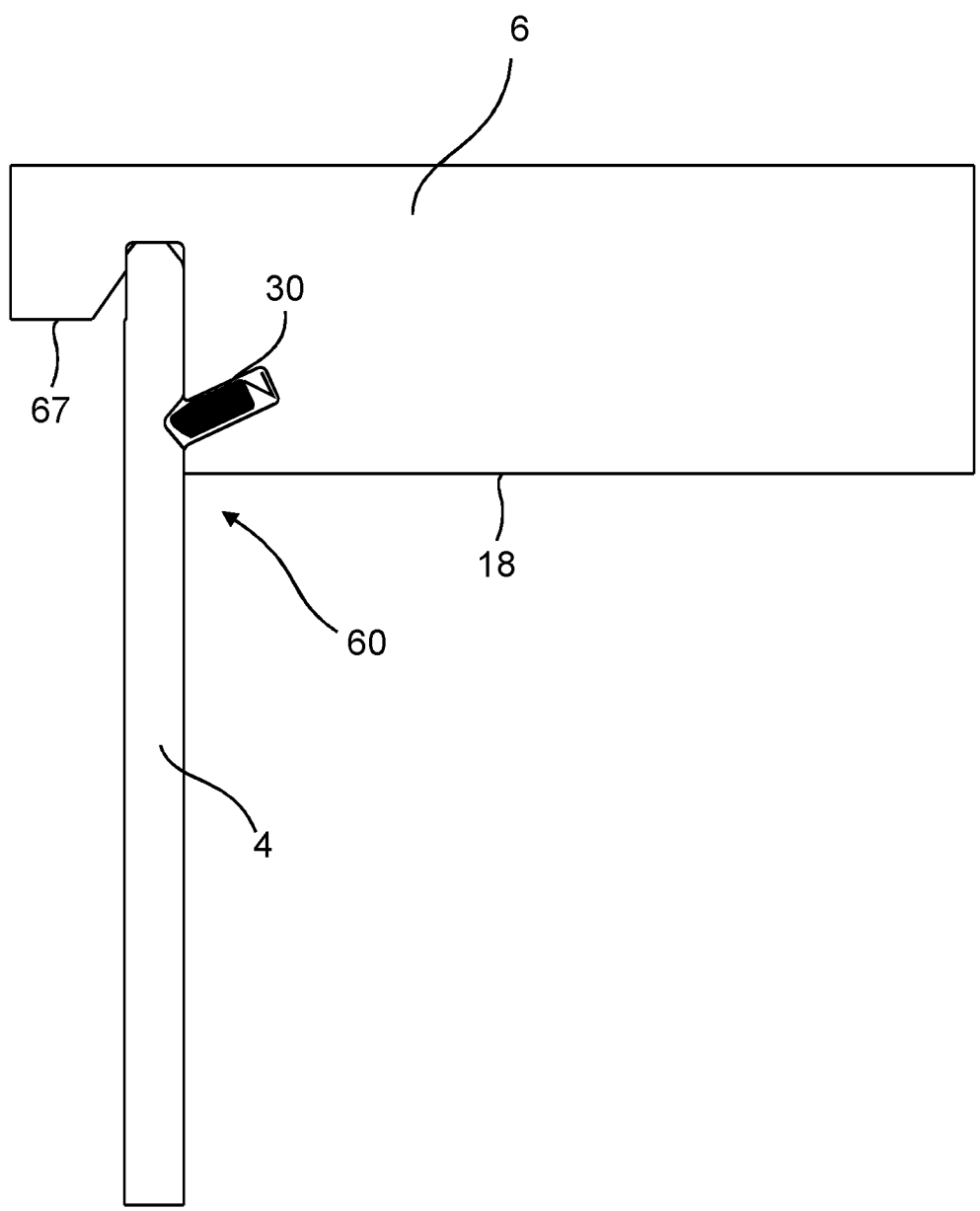
FIG. 3 shows an embodiment of the angleable locking device according to the invention.

FIG. 3 shows an embodiment of the angleable locking device comprising an outer edge surface 67 adjacent the edge groove. The outer edge surface of this embodiment is closer to a bottom 75 of the edge groove 21 and the second wall of the edge groove is shorter as compared to the embodiment shown in FIGS. 1A-1B. The outer edge surface is facing the adjacent panel. An advantage may be that the adjacent panel is easier to disassemble by said angling motion.

Figure 4A:
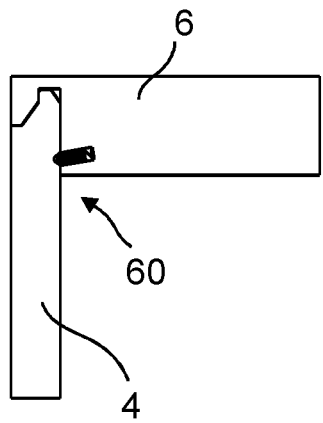
FIGS. 4A-4C show an embodiment of a method to disassemble an embodiment of the present invention.
Figure 4B:
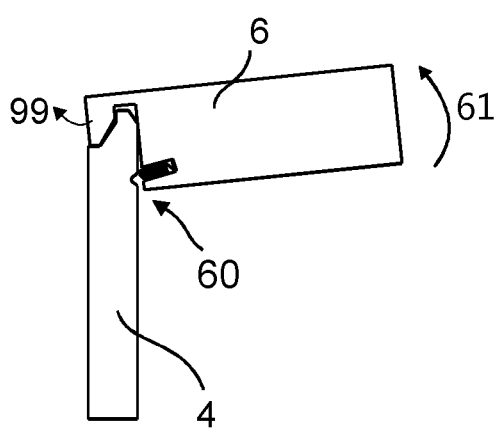
Figure 4C:
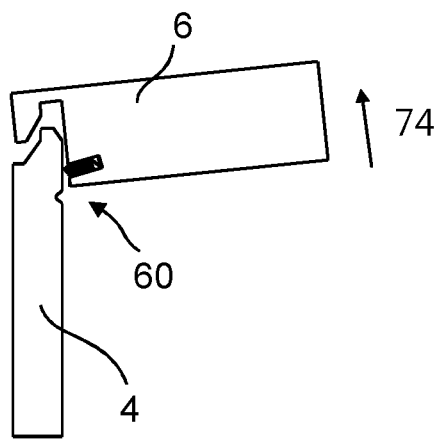
Figure 4D:
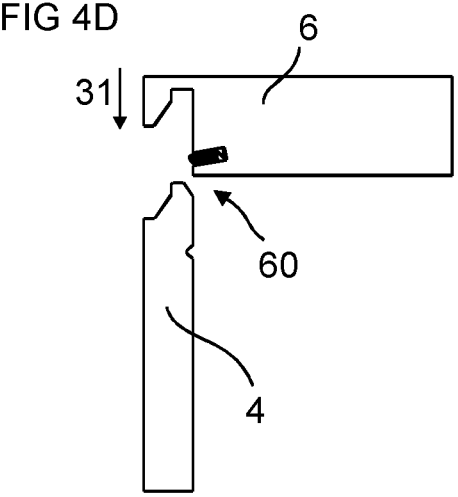
FIGS. 4D-4F show an embodiment of a method to assemble the embodiment shown in FIGS. 4A-4C.
Figure 4E:
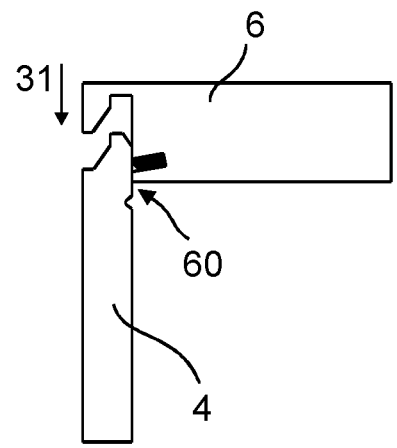
Figure 4F:
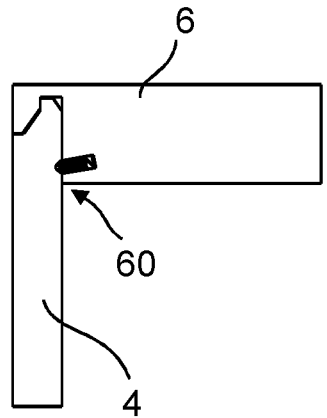

FIGS. 4A-4C show an embodiment of a method to disassemble and FIG. 4D-4F a method to assemble an embodiment of the panel 6 and the adjacent panel 4 that comprises the angleable locking device show in FIG. 9A and described below. A difference to the method shown in FIG. 2A-2F is that a bottom part at the edge groove is bendable such that a side part of the edge groove is displaceable 99 during the angling motion 61. The side part of the edge groove may bend up to 25°, preferably up to 15°, preferably 1-10°. The panel 6 and adjacent panel 4 could also be assembled by reversing the movements shown in FIGS. 2A-2C.

Figure 5A:
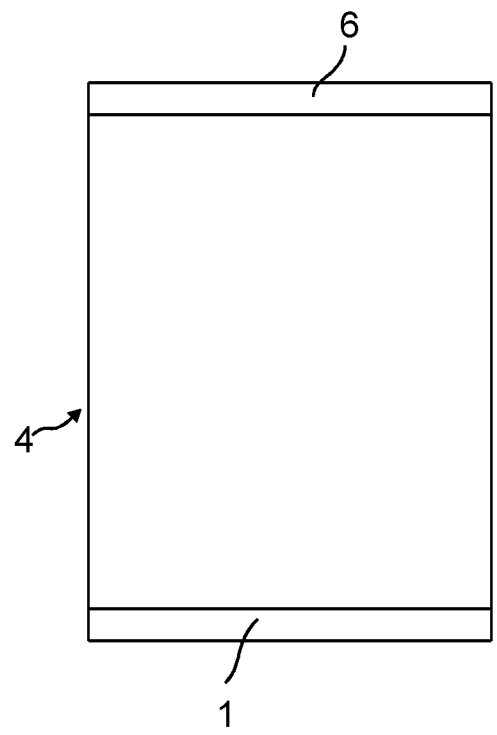
FIGS. 5A-5B show an embodiment of an assembled product in a side view and a bottom view, respectively, of the present invention.
Figure 5C:
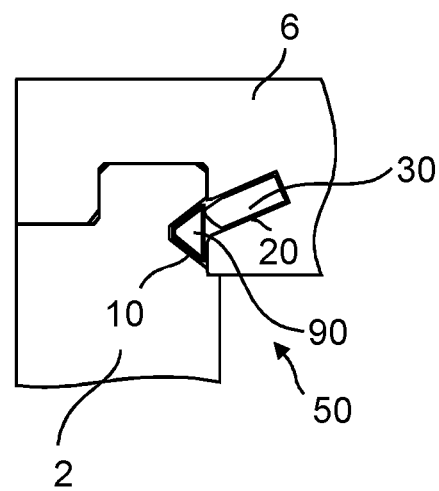
FIG. 5C shows an embodiment of a frame joint during unlocking according to an embodiment of the invention.
Figure 5B:
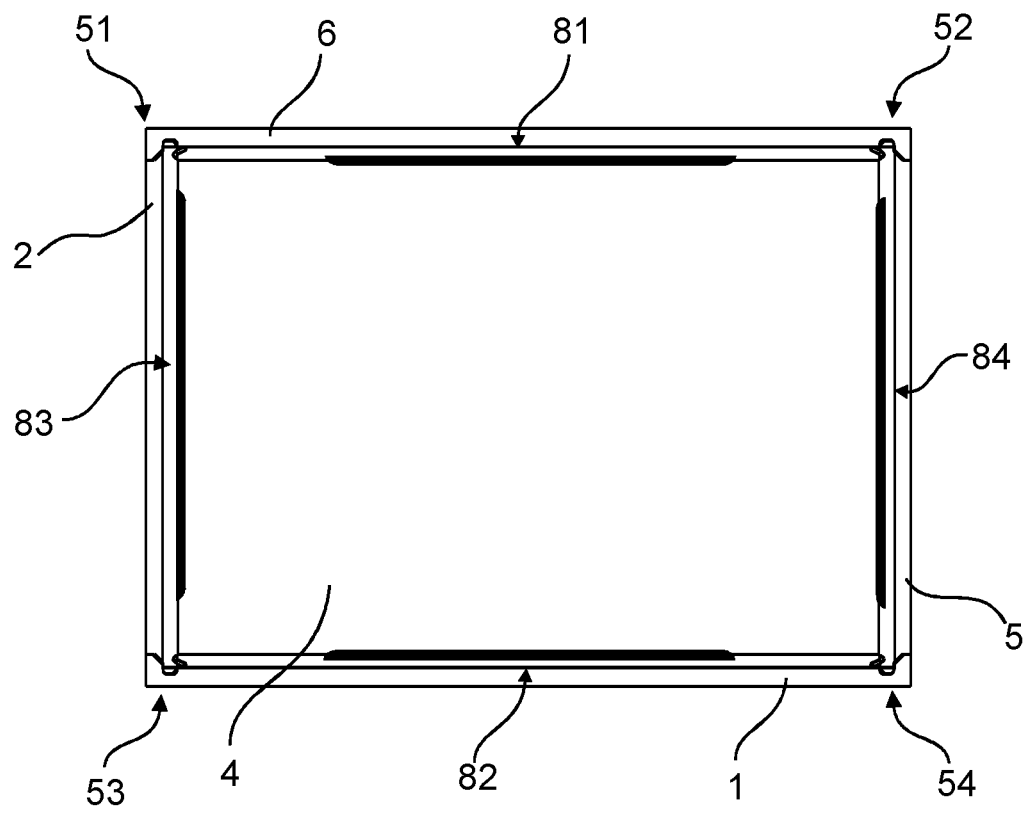
Figure 7A:
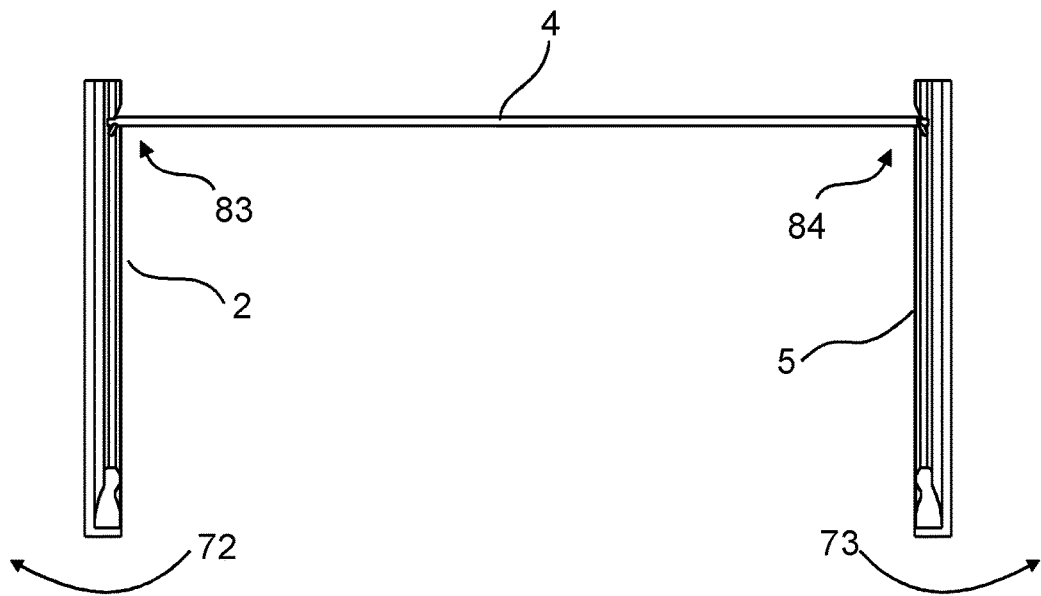
FIG. 7A shows an embodiment of a method to disassemble the embodiment shown in FIGS. 6A-6D.
Figure 8A:
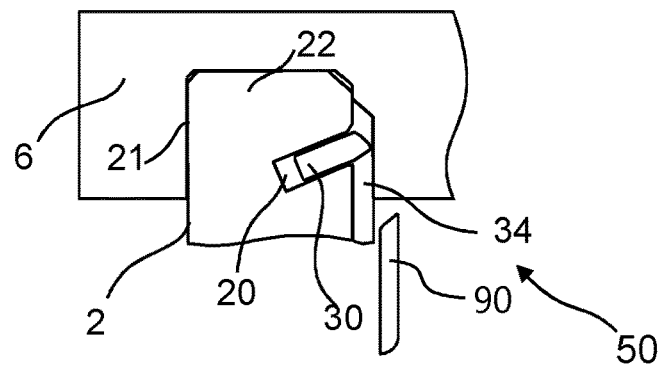
FIGS. 8A-8B show embodiments of frame joint during unlocking as a part of an embodiment of the invention.
Figure 8B:
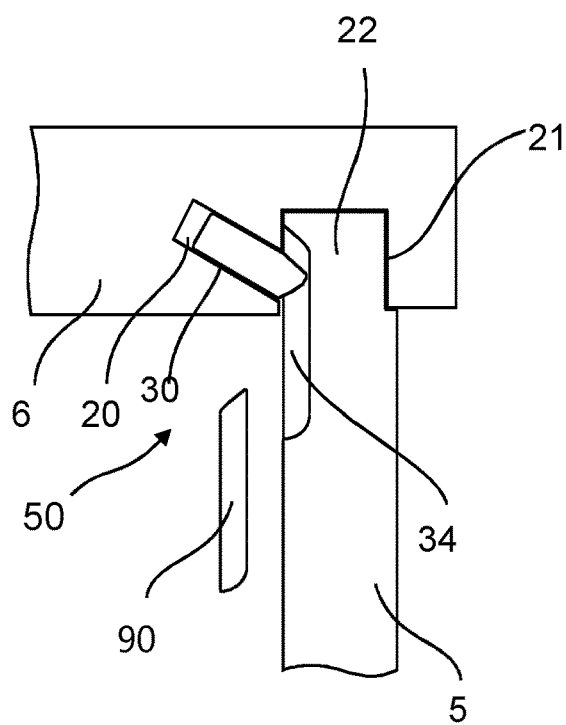

FIGS. 5A-5B show an assembled furniture product comprising a frame and a back piece 4. The frame comprises four frame panels 1,2,5,6, e.g. a top panel 6, a bottom panel 1, a first and a second side panel 2, 5. FIG. 5A shows the assembled product from a side view and FIG. 5B shows the assembled product from a back view. A first and a second corner edge 51, 52 of the frame each comprises a corner locking device 50 for locking two adjacent frame panels to each other. Said corner locking device comprising a flexible tongue 30, wherein the corner locking device is un-lockable by displacing and/or compressing the flexible tongue by a tool 90 as is shown in FIG. 5C. Alternative embodiments of said corner locking device is shown in FIG. 8A-8B. These corner locking devices are described and shown in FIG. 7D-7E in WO2015/038059(A1). FIGS. 7D-7E and the related disclosure at page 12, lines 10-26, in WO2015/038059 are hereby expressly incorporated by reference herein.

A third and a fourth corner edge 53, 54 of the frame each preferably comprises a corner locking device 50 for locking two adjacent frame panels to each other. The back piece 4 is connected to the frame by an embodiment of the angleable locking device 60 as disclosed above. The back piece 4 may comprise four edges. The back piece is in a preferred embodiment of the assembled furniture product connected at four edges 81, 82, 83, 84 to the frame. Each edge is preferably connected by an embodiment of said angleable locking device 60 as disclosed above.

Figure 6A:
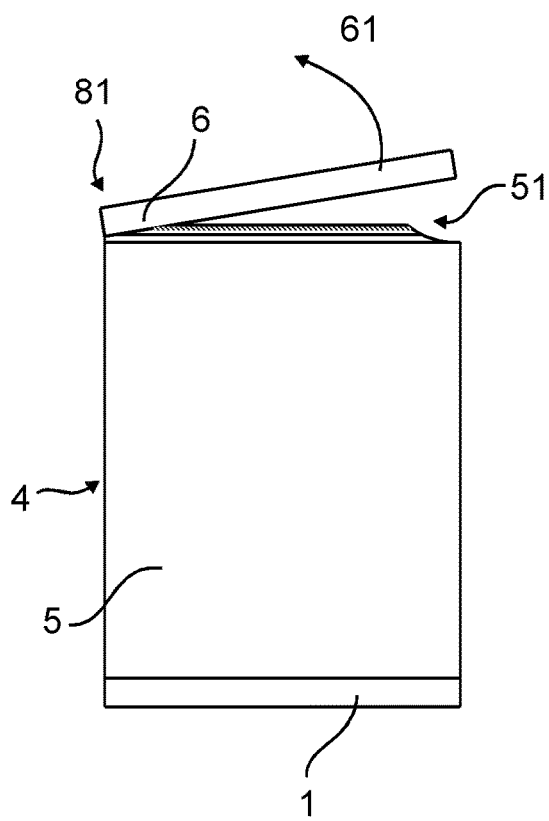
FIGS. 6A-6D show an embodiment of a method to disassemble an embodiment of the present invention.
Figure 6B:
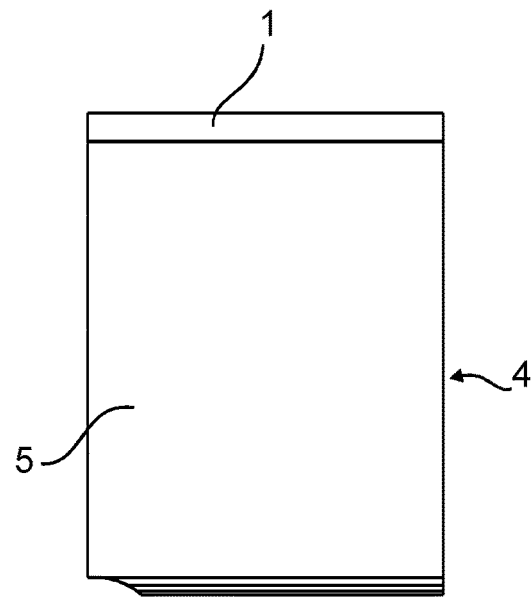
Figure 6C:
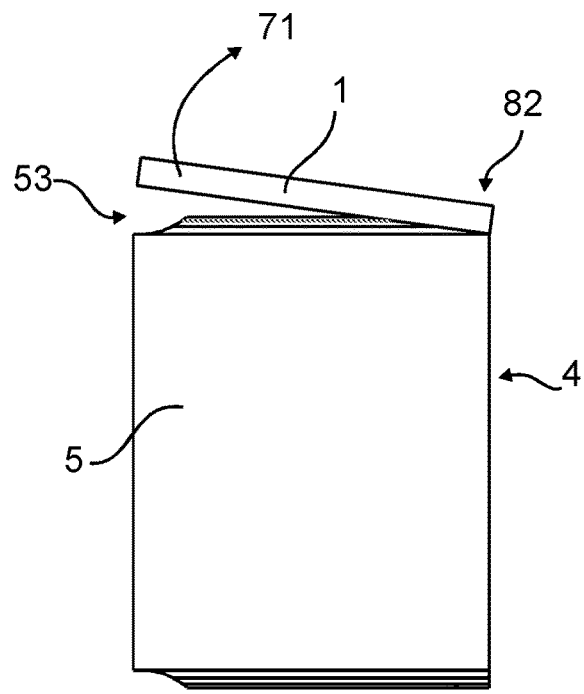
Figure 6D:
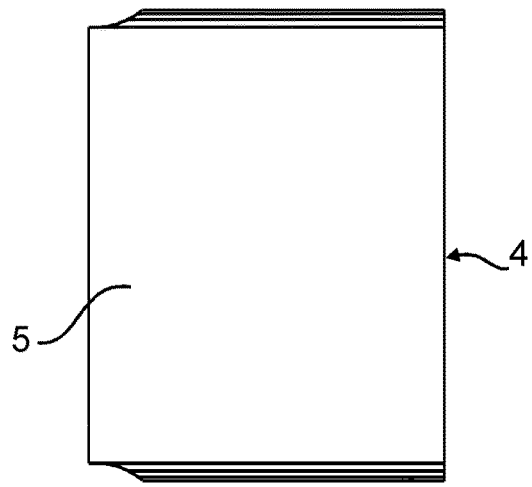

FIGS. 6A-6D and FIG. 7A show an embodiment of a method for disassembling a furniture product comprising a frame and a back piece, such as the furniture product shown in FIG. 5A-5C. The furniture product is in FIGS. 6A-6D shown in a side view and in FIG. 7A in a top view. An un-locking of a first and a second corner locking device 50, at a first corner edge 51 and at a second corner edge 52 of a top panel 6, respectively, by displacing and/or compressing a flexible tongue of the first and of the second corner locking device, see e.g. FIG. 5C, respectively, and angling up the top panel by angling motion 61, is shown in FIG. 6A. A back piece connected to the top panel 6 by an angleable locking device 81 is unlocked by said angling motion. The top panel 6 is thereafter removed. FIG. 6B shows that the furniture product is rotated such that a bottom panel 1 of the furniture product is at the top. An un-locking of a third and a fourth corner locking device 50, at a third corner edge 53 and at a fourth corner edge 54 of a bottom panel 1, respectively, by displacing and/or compressing a flexible tongue 50 of the third and of the fourth corner locking device, respectively, and an angling up of the bottom panel 1 by an angling motion 71, is shown in FIG. 6C. The back piece 4 connected to the bottom panel by an angleable locking device 82 is unlocked by said angling motion 71. The bottom panel 1 is thereafter removed, see FIG. 6D.

The method may comprise unlocking a first side 2 panel and a second side panel 5 of the frame. The first side panel may be unlocked by an angling 72 motion or a sliding motion of the first panel relative the back piece. The second side panel may be unlocked by an angling motion 73 or a sliding motion of the second panel relative the back piece.

Figure 7B:
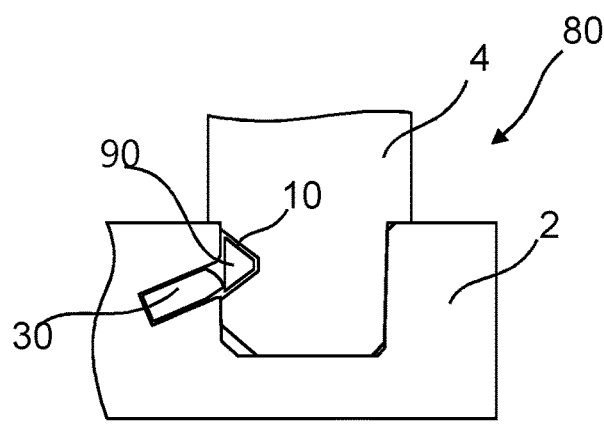
FIGS. 7B-7C embodiments of a back piece joint during unlocking as a part of an embodiment of the invention.
Figure 7C:
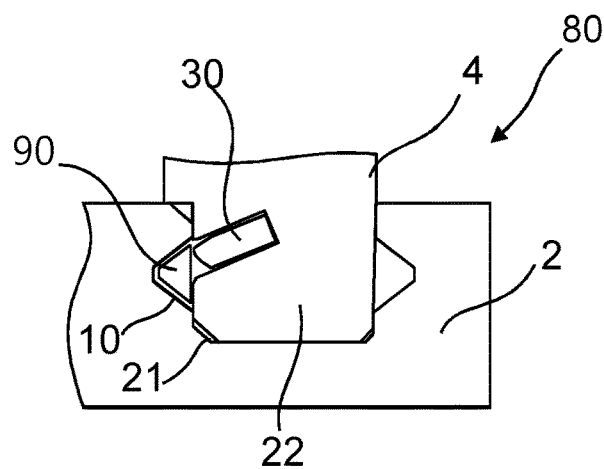
Figure 8C:
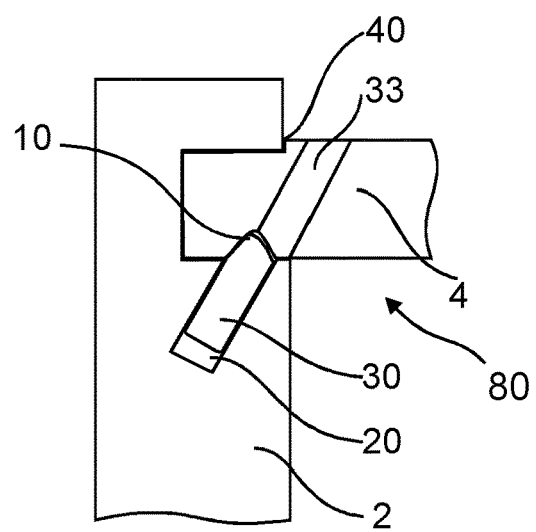
FIG. 8C shows an embodiment of a back piece joint during unlocking as a part of an embodiment of the invention.

The first side panel may alternative be unlocked by displacing and/or compressing a flexible tongue 30 by a tool of a locking device 80 at a joint between the first side panel and the back piece. The second side panel may alternative be unlocked by displacing and/or compressing a flexible tongue 30 by a tool 90 of a locking device 80 at a joint between the second side panel 5 and the back piece 4. The first side panel and the second side panel may for these alternatives be connected by e.g. a locking device configured as shown in FIG. 7B, FIG. 7C or FIG. 8C during unlocking by a tool 90. These locking devices are described and shown in FIG. 2C and FIG. 7B-7C in WO2015038059(A1). FIGS. 2C and 7B-7C and the related disclosure at page 8, line 33 to page 9, line 3 and page 12, lines 7-8, in WO2015/038059 are hereby expressly incorporated by reference herein.

Figure 9A:
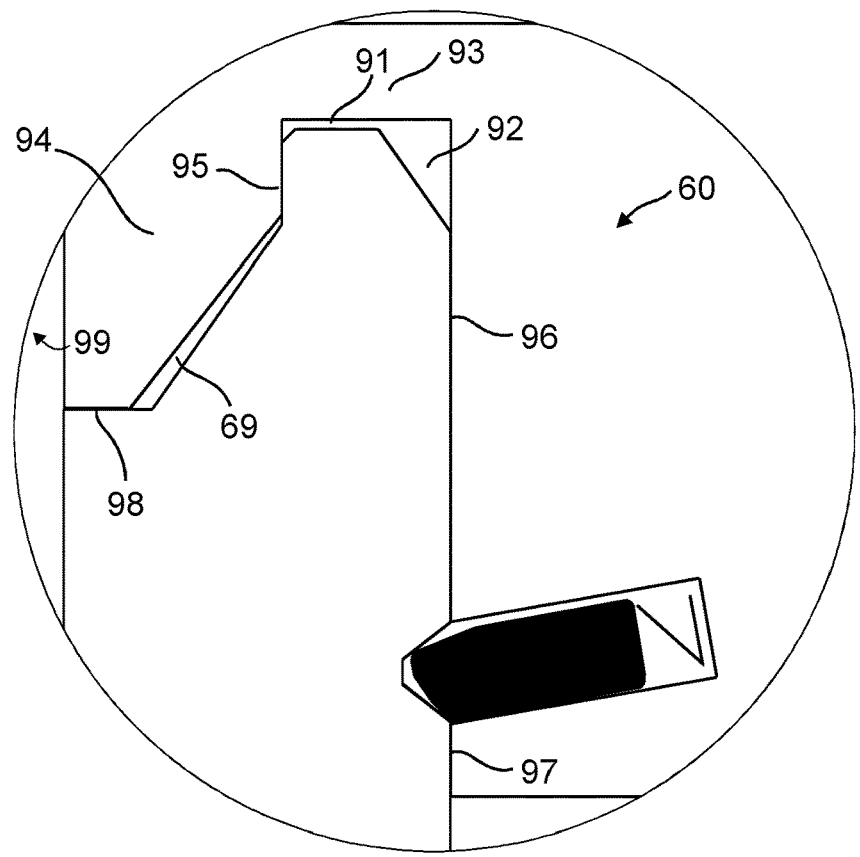
FIG. 9A shows an enlargement of the embodiments shown in FIGS. 4A-4F.

FIG. 9A shows an enlarged view of the embodiment of the angleable locking device 60 shown in FIG. 4A-4F, in a locked position of the panel and the adjacent panel. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The angleable locking device may comprise cooperating surfaces 98 at the second side of the opening of the edge groove 21, preferably at an outer edge surface at an outer corner of the panel and the adjacent panel in a locked position. The cooperating surfaces 98 may hide the locking system and improve the appearance. A bottom part 93 of the panel at a bottom of the edge groove and a side part 94 may be bendable such that a side part is displaceable 99 for enabling said angling motion 61. The side part of the edge groove may bend up to 25°, preferably up to 15°, preferably 1-10°. The edge groove may become wider by a displacement of said side part. For example, at the opening of the edge groove, the width may become wider by 5 to 30%, preferably 5 to 10%.

Figure 9B:
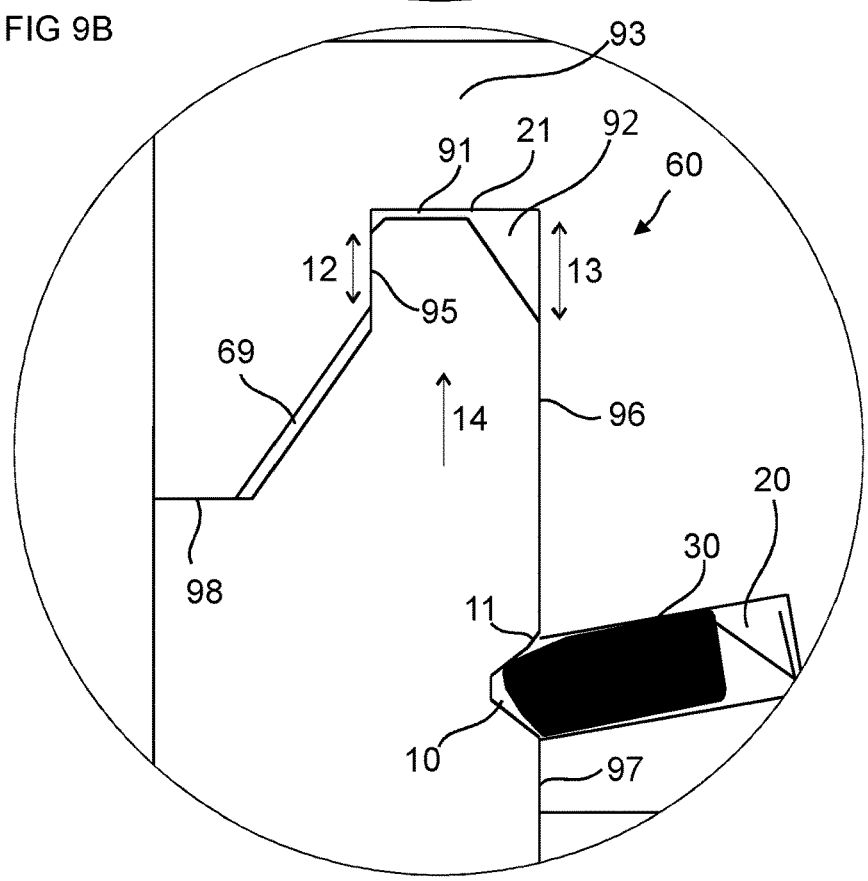
FIG. 9B shows an enlargement of an embodiment of the angleable locking device.

FIG. 9B shows an enlarged view of an embodiment of the angleable locking device 60 in a locked position of the panel and the adjacent panel. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The second space 92 preferably extends a distance 13 which is about the same or greater than a length 12 of the contact surfaces 95 between the edge groove 21 and the second edge 22 at the second side of the edge groove, in a depth direction 14 of the edge groove which is preferably perpendicular to the first main plane. Distance 13 is measured from a plane at the outermost surface of the second edge 22 to the start of the contact surfaces 96. The distance 13 may range in size from the length 12 of the contact surfaces between the edge groove and the second edge to a size of three times the length 12, optionally 1.1 times to two times the length 12. The angleable locking device may comprise cooperating surfaces 98 at the second side of the opening of the edge groove 21, preferably at an outer edge surface at an outer corner of the panel and the adjacent panel in a locked position. The cooperating surfaces may hide the locking system and improve the appearance.

Figure 10:
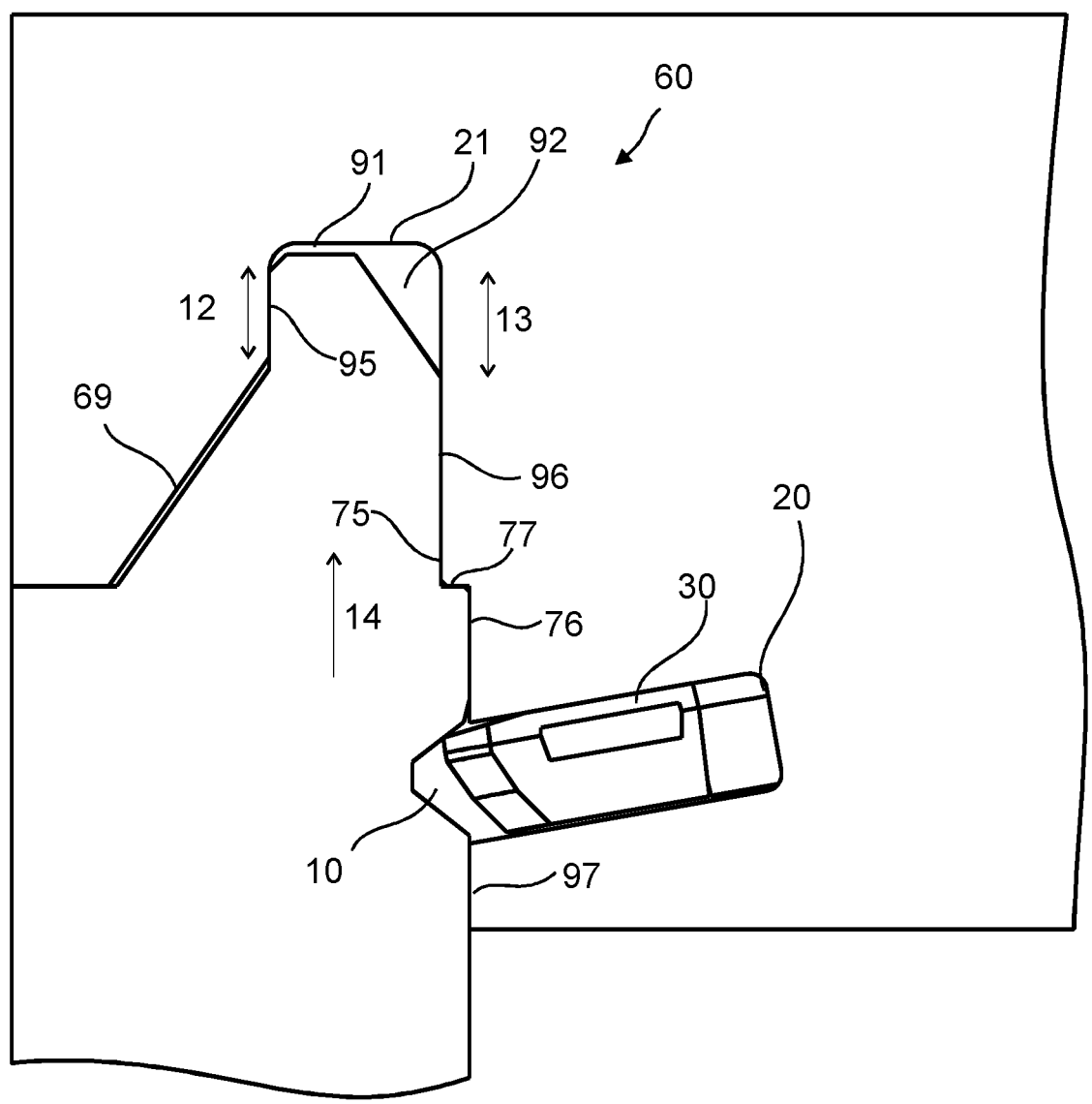
FIG. 10 shows an enlargement of an embodiment of the angleable locking device.

FIG. 10 shows an enlarged view of an embodiment of the angleable locking device 60 in a locked position of the panel and the adjacent panel. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The second space 92 preferably extends a distance 13 which is about the same or greater than a length 12 of the contact surfaces 95 between the edge groove 21 and the second edge 22 at the second side of the edge groove, in a depth direction 14 of the edge groove which is preferably perpendicular to the first main plane. The distance 13 may range in size from the length 12 of the contact surfaces between the edge groove and the second edge to a size of three times the length 12, optionally 1.1 times to two times the length 12. The second edge 22 and the edge groove 21 of the embodiment comprises cooperating surfaces 77 at the first side of the edge groove, preferably between the insertion groove 20 and a bottom surface of the edge groove, for positioning of the second edge 22 relative the edge groove 21 in the depth direction 14. The cooperating surfaces may be between a first surface of a recess 75 at the second edge 22 and a second surface of a recess 76 at the edge groove 21.

Figure 11A:
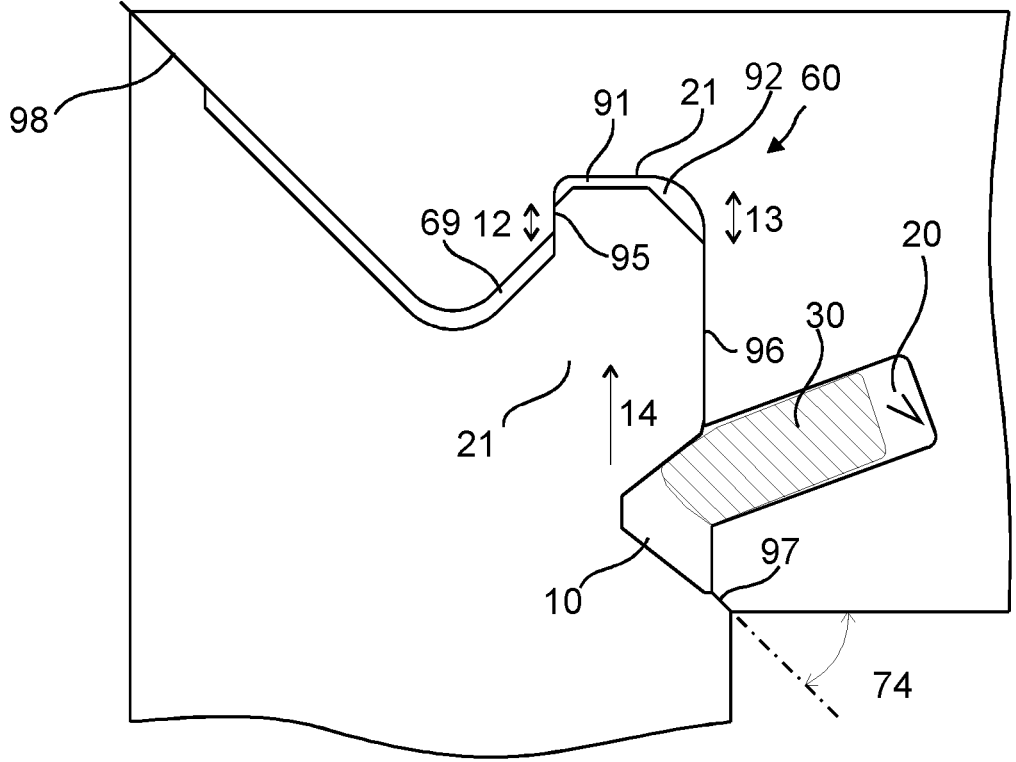
FIGS. 11A-11B show enlargements of embodiments of the angleable locking device.
Figure 11B:
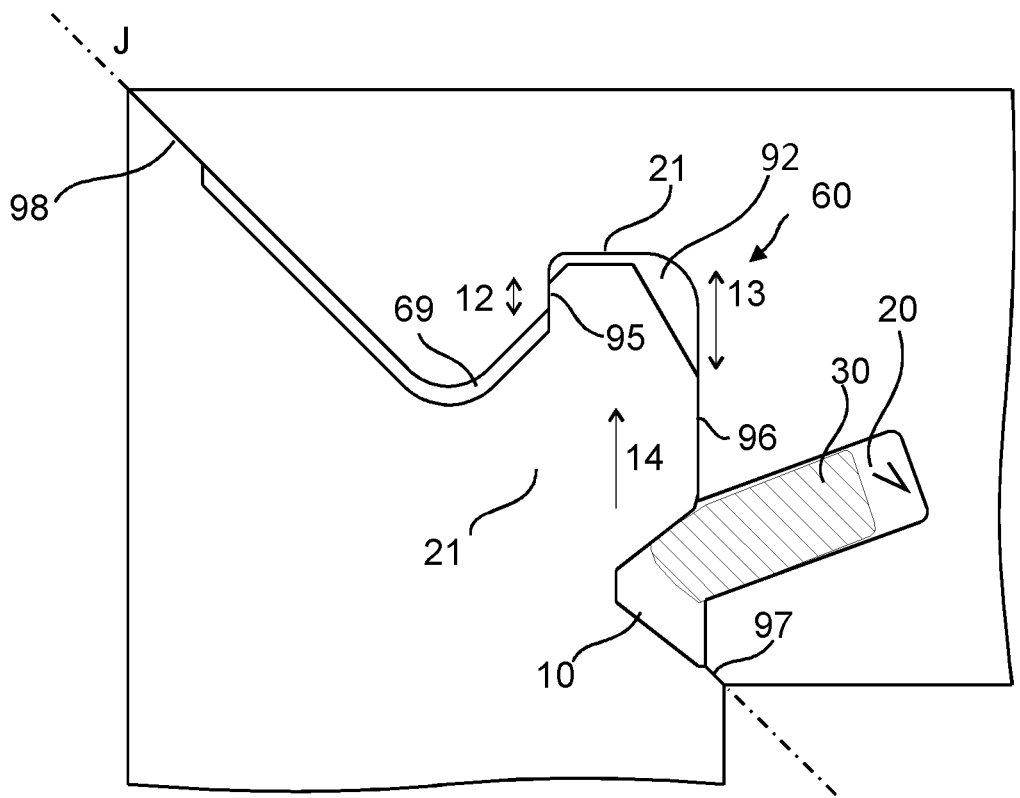

FIG. 11A-11B show an enlarged views of embodiments of the angleable locking device 60 in a locked position of the panel and the adjacent panel. The first main plane is essentially perpendicular to the second main plane and panel and the adjacent panel are joined at a junction plane which is extending between the first main plane and the second main plane. An angle between the junction plane and the first main plane may be of about 45°, optionally between 15t8 and 75°, or between 30° and 60°. The angleable locking device comprises a third space 91 between an outermost surface of the second edge 22 and the edge groove 21 and a second space 92 between an outer edge of the second edge 22 and the edge groove 21 at the first side of the edge groove 21 for enabling said angling motion 61. The embodiment may comprise cooperating surfaces 97 at the first side of the opening of the edge groove 21 in a locked position of the panel 6 and the adjacent panel 4, preferably at an inner corner of the panel and the adjacent panel. The embodiment may further comprise cooperating surfaces 98 at the second side of the opening of the edge groove 21, preferably at an outer edge surface at an outer corner of the panel and the adjacent panel in a locked position The second space 92 shown in FIG. 11A extends a distance 13, which is about the same as a length 12 of the contact surfaces 95 between the edge groove 21 and the second edge 22 at the second side of the edge groove, in a depth direction 14 of the edge groove which is preferably perpendicular to the first main plane.

The second space 92 shown in FIG. 11B extends a distance 13, which is about three times the length 12 of the contact surfaces 95 between the edge groove 21 and the second edge 22 at the second side of the edge groove, in a depth direction 14 of the edge groove which is preferably perpendicular to the first main plane.

The second space 92, which extend a shorter distance, shown in FIG. 11A may provide a stronger locking and the second space 92, which extend a longer distance, shown in FIG. 11B may facilitate unlocking by said angling motion.

The distance 13 may be in the range of about one time to about three times the length 12 of the contact surfaces 95 between the edge groove and the second edge.

Embodiments of the angleable locking device may comprise a bevel or rounding 11 at an opening of the tongue groove 10. An advantage of the bevel or the rounding 11 may be that the flexible tongue 30 easier slides out of the tongue groove 10 during unlocking by said angling motion. The bevel or rounding may be quite small and produced by cutting or sanding.

A core material of the panels in the embodiments above preferably comprises a wood fibre based board, such as a HDF, MDF, plywood, solid wood or particleboard, a reinforced plastic board, or a wood fibre composite board.

Embodiments

1. A set of panels, preferably for a furniture product, comprising a panel (6) with a first main plane and an adjacent panel (4) with a second main plane, wherein the panel and the adjacent panel comprise an angleable locking device (60) for locking a first edge of the panel (6) to a second edge (22) of the adjacent panel (4), wherein the first main plane is essentially perpendicular to the second main plane, characterized in:
that the angleable locking device comprises an edge groove (21) at the first edge and a tongue groove (10) at the second edge (22), the edge groove (21) comprises a flexible tongue (30) arranged in an insertion groove (20) at a first side of the edge groove (21), said flexible tongue is configured to cooperate with the tongue groove (10) for locking together the first and the second edges in a first direction which is perpendicular to the first main plane, that the angleable locking device further comprises contact surfaces (96, 95) between the edge groove (21) and the second edge (22) at the first side and at a second side, respectively, of the edge groove (21) for locking together the first and the second edges in a second direction which is parallel to the first main plane, and that the angleable locking device is configured to be unlocked by an angling motion (61) of the panel (6) relative the adjacent panel (4), such that an angle between the first and the second main plane increases.

2. The set of panels as in embodiment 1, wherein the angleable locking device is configured such that the flexible tongue (30) moves out of the tongue groove (10) by the angling motion (61).

3. The set of panels as in embodiment 1, wherein the angleable locking device comprises a first space (69) between the first edge and the second edge (22) at a second side of an opening of the edge groove (21) in a locked position of the panel and the adjacent panel.

4. The set of panels as in embodiment 3, wherein the angleable locking device comprises cooperating surfaces (97) at a first side of the opening of the edge groove (21) in a locked position of the panel (6) and the adjacent panel (4), preferably at an inner corner of the panel and the adjacent panel.

5. The set of panels as in embodiment 3 or 4, wherein the angleable locking device comprises a recess (65), such as a bevel, at the first edge, to obtain said first space.

6. The set of panels as in embodiments 3-5, wherein the angleable locking device comprises a recess (64) at the second edge (22) to obtain said first space.

7. The set of panels as in embodiments 3-5, wherein the angleable locking device comprises a recess (63,62), such as a bevel, at a first and/or a second outer edge for enabling said angling motion (61).

8. The set of panels as in any one of the preceding embodiments, wherein the angleable locking device comprises a second space (92) between an outer edge of the second edge (22) and the edge groove (21) at the first side of the edge groove (21) for enabling said angling motion (61).

9. The set of panels as in any one of the preceding embodiments, wherein the edge groove (21) extends along essentially the entire length of the second edge (22).

10. The set of panels as in any one of the preceding embodiments, wherein the flexible tongue (30) is displaceable in the insertion groove (20).

11. The set of panels as in any one of the preceding embodiments, wherein the angleable locking device comprises a third space (91) between an outermost surface of the second edge (22) and the edge groove (21).

12. The set of panels as in any one of the preceding embodiments, wherein the angleable locking device comprises cooperating surfaces (98) at the second side of an opening of the edge groove (21), preferably at an outer edge surface at an outer corner of the panel and the adjacent panel in a locked position.

13. The set of panels as in any one of the preceding embodiments, wherein the angleable locking device comprises a bottom part (93) of the panel at a bottom of the edge groove and a side part (94), wherein the bottom part is bendable such that the side part is displaceable for enabling said angling motion (61).

14. The set of panels as in any one of the preceding embodiments, wherein the angleable locking device comprises a bevel or rounding (11) at an opening of the tongue groove (10).

15. The set of panels as in any one of the preceding embodiments, wherein the second edge (22) and the edge groove (21) comprise cooperating surfaces (77) at the first side of the edge groove (21), preferably between the insertion groove (20) and a bottom surface of the edge groove (21), for positioning of the second edge (22) relative the edge groove in a depth direction (14) of the edge groove (21).

16. The set of panels as in embodiment 15, wherein the cooperating surfaces (77) are a first surface of a recess (75) at the second edge (22) and a second surface of a recess (76) at the edge groove (21).

17. An assembled furniture product comprising a frame and a back piece (4), wherein the frame comprises panels (1,2,5,6), wherein a first and a second corner edge (51, 52) of the frame each comprises a corner locking device (50) for locking two adjacent panels to each other, said corner locking device comprising a flexible tongue (30), wherein the corner locking device is un-lockable by displacing and/or compressing the flexible tongue by a tool (90), characterised in that the back piece (4) is connected to the frame by the angleable locking device (60) according to any one of the embodiments 1-16.

18. A method for disassembling a furniture product comprising a frame and a back piece, wherein the method comprises:

un-locking a first and a second corner locking device (50), at a first corner edge (51) and at a second corner edge (52) of a top panel (6), respectively, by displacing and/or compressing a flexible tongue of the first and of the second corner locking device, respectively, angling up the top panel by an angling motion (61), and unlocking by said angling motion a back piece connected to the top panel by an angleable locking device (81), and removing the top panel (6).

19. The method as in embodiment 18, wherein the method comprises:

rotating the furniture product, un-locking a third and a fourth corner locking device (50), at a third corner edge (53) and at a fourth corner edge (54) of a bottom panel (1), respectively, by displacing and/or compressing a flexible tongue (50) of the third and of the fourth corner locking device, respectively, angling up the bottom panel (1) by an angling motion (71), and unlocking by said angling motion (71) the back piece (4) connected to the bottom panel by an angleable locking device (82), and removing the bottom panel (1).

The invention claimed is:

1. A method for disassembling a furniture product comprising a frame, first and second corner locking devices and a back piece, the frame including a top panel, a first lateral panel and a second lateral panel, the first and second corner locking devices configured to lock the top panel respectively to the first and second lateral panels, and the first and second lateral panels being locked to the back piece, wherein the method comprises:

unlocking the first corner locking device, at a first corner edge of the top panel, by displacing at least part of a first flexible tongue of the first corner locking device prior to displacing the first corner edge relative to the first lateral panel;

unlocking the second corner locking device, at a second corner edge of the top panel, by displacing at least part of a second flexible tongue of the second corner locking device prior to displacing the second corner edge relative to the second lateral panel;

prior to relative displacement of the top panel away from the back panel, angling up the top panel by an angling motion;

unlocking, by said angling motion, an angleable locking device connecting the back piece to the top panel, to allow displacement of the top panel away from the back piece; and removing the top panel, while the first and second lateral panels remain locked to the back piece.

2. The method as claimed in claim 1, wherein the frame further includes a bottom panel, and the method further comprises:

rotating the furniture product, unlocking a third corner locking device and a fourth corner locking device, at a third corner edge and at a fourth corner edge of the bottom panel, respectively, by displacing at least part of a third flexible tongue of the third corner locking device and at least part of a fourth flexible tongue of the fourth corner locking device, respectively, angling up the bottom panel by another angling motion, and unlocking by said other angling motion the back piece connected to the bottom panel by another angleable locking device, and removing the bottom panel.

3. The method as claimed in claim 2, wherein the displacing of the at least part of the third flexible tongue of the third corner locking device is performed prior to displacing the third corner edge relative to the first lateral panel, and the displacing of the at least part of the fourth flexible tongue of the fourth corner locking device is performed prior to displacing the fourth corner edge relative to the second lateral panel.

4. The method as claimed in claim 2, wherein the angling up of the bottom panel is performed prior to relative displacement of the bottom panel away from the back panel.

5. The method as claimed in claim 2, wherein the unlocking by said other angling motion unlocks the other angleable locking device to allow displacement of the bottom panel away from the back piece.

* * * * *